(12) United States Patent
Purkis

(10) Patent No.: US 9,103,197 B2
(45) Date of Patent: Aug. 11, 2015

(54) SWITCHING DEVICE FOR, AND A METHOD OF SWITCHING, A DOWNHOLE TOOL

(75) Inventor: Daniel Purkis, Ellon (GB)

(73) Assignee: Petrowell Limited, Aberdeen (GB)

( * ) Notice: Subject to any disclaimer, the term of this patent is extended or adjusted under 35 U.S.C. 154(b) by 1171 days.

(21) Appl. No.: 12/866,822

(22) PCT Filed: Mar. 6, 2009

(86) PCT No.: PCT/GB2009/050227
§ 371 (c)(1),
(2), (4) Date: Oct. 14, 2010

(87) PCT Pub. No.: WO2009/109788
PCT Pub. Date: Sep. 11, 2009

(65) Prior Publication Data
US 2011/0248566 A1   Oct. 13, 2011

(30) Foreign Application Priority Data
Mar. 7, 2008 (GB) .................................. 0804306.9

(51) Int. Cl.
*G01V 3/00* (2006.01)
*E21B 43/1185* (2006.01)
*E21B 33/035* (2006.01)

(52) U.S. Cl.
CPC .......... *E21B 43/1185* (2013.01); *E21B 33/0355* (2013.01)

(58) Field of Classification Search
CPC .................................................. E21B 33/0355
USPC ........ 307/104; 340/854.6, 854.8; 106/250.01; 166/65.1, 250.01, 254.2
See application file for complete search history.

(56) References Cited

U.S. PATENT DOCUMENTS

| 3,227,228 A | 1/1966 | Bannister |
| 3,233,674 A | 2/1966 | Leutwyler |

(Continued)

FOREIGN PATENT DOCUMENTS

| EP | 1214501 B1 | 4/2005 |
| EP | 1698961 A1 | 9/2006 |

(Continued)

OTHER PUBLICATIONS

Strømmen, Henrik, "International Search Report", for PCT/GB2009/050227 as mailed Jul. 15, 2009, 4 pages.

(Continued)

*Primary Examiner* — Daniel Cavallari
(74) *Attorney, Agent, or Firm* — Winstead PC

(57) ABSTRACT

The switching device comprises an electronic switch (111) embedded within a downhole tool (100) and an activator (20) for remote switching of the electronic switch (111). The activator (20) may be a handheld unit that is used at the surface of the wellbore by an operator or may be a wireline run unit. The activator (20) permits wireless and contactless activation of the electronic switch (111) without the need for mechanical switches which could provide a point of failure for the downhole tool (100). The electronic switch (111) comprises an electronics module and a power source such as one or more batteries (126) wherein in the active configuration, the switch (111) can allow electrical connection between the electronics module and the power source (126) and in the inactive configuration, the switch (111) prevents electrical connection between the electronics module and the power source (126).

18 Claims, 2 Drawing Sheets

(56) References Cited

U.S. PATENT DOCUMENTS

| | | | |
|---|---|---|---|
| 3,914,732 A | 10/1975 | Brumleve et al. | |
| 4,057,781 A | 11/1977 | Scherbatskoy | |
| 4,432,417 A | 2/1984 | Bowyer | |
| 4,617,960 A | 10/1986 | More | |
| 4,698,631 A | 10/1987 | Kelly, Jr. et al. | |
| 4,712,613 A | 12/1987 | Nieuwstad | |
| 4,796,699 A | 1/1989 | Upchurch | |
| 4,856,595 A | 8/1989 | Upchurch | |
| 4,896,722 A | 1/1990 | Upchurch | |
| 4,915,168 A | 4/1990 | Upchurch | |
| 4,928,088 A | 5/1990 | Jorion et al. | |
| 5,142,128 A | 8/1992 | Perkin et al. | |
| 5,146,983 A | 9/1992 | Hromas et al. | |
| 5,203,414 A | 4/1993 | Hromas et al. | |
| 5,226,494 A | 7/1993 | Rubbo et al. | |
| 5,289,372 A | 2/1994 | Guthrie et al. | |
| 5,343,963 A | 9/1994 | Bouldin et al. | |
| 5,360,967 A | 11/1994 | Perkin et al. | |
| 5,558,153 A | 9/1996 | Holcombe et al. | |
| 5,579,283 A | 11/1996 | Owens et al. | |
| 5,611,401 A | 3/1997 | Myers, Jr. et al. | |
| 5,706,896 A | 1/1998 | Tubel et al. | |
| 5,833,002 A * | 11/1998 | Holcombe | 166/291 |
| 5,893,413 A | 4/1999 | Lembcke et al. | |
| 5,991,602 A | 11/1999 | Sturm | |
| 6,012,518 A | 1/2000 | Pringle et al. | |
| 6,021,095 A | 2/2000 | Tubel et al. | |
| 6,055,213 A | 4/2000 | Rubbo et al. | |
| 6,109,357 A | 8/2000 | Zimmerman | |
| 6,244,351 B1 | 6/2001 | Patel et al. | |
| 6,308,137 B1 | 10/2001 | Underhill et al. | |
| 6,333,699 B1 | 12/2001 | Zierolf | |
| 6,333,700 B1 | 12/2001 | Thomeer et al. | |
| 6,343,649 B1 | 2/2002 | Beck et al. | |
| 6,347,292 B1 | 2/2002 | Denny et al. | |
| 6,349,772 B2 | 2/2002 | Mullen et al. | |
| 6,359,569 B2 * | 3/2002 | Beck et al. | 340/856.3 |
| 6,384,738 B1 | 5/2002 | Carstensen et al. | |
| 6,388,577 B1 | 5/2002 | Carstensen | |
| 6,414,905 B1 | 7/2002 | Owens et al. | |
| 6,443,228 B1 | 9/2002 | Aronstam et al. | |
| 6,480,811 B2 | 11/2002 | Denny et al. | |
| 6,481,505 B2 | 11/2002 | Beck et al. | |
| 6,488,082 B2 | 12/2002 | Echols et al. | |
| 6,497,280 B2 | 12/2002 | Beck et al. | |
| 6,536,524 B1 | 3/2003 | Snider | |
| 6,588,505 B2 | 7/2003 | Beck et al. | |
| 6,597,175 B1 | 7/2003 | Brisco | |
| 6,604,063 B2 | 8/2003 | Denny et al. | |
| 6,624,759 B2 | 9/2003 | Tubel et al. | |
| 6,684,953 B2 | 2/2004 | Sonnier | |
| 6,710,720 B2 | 3/2004 | Carstensen et al. | |
| 6,745,833 B2 | 6/2004 | Aronstam et al. | |
| 6,759,968 B2 | 7/2004 | Zierolf | |
| 6,760,275 B2 | 7/2004 | Carstensen | |
| 6,776,240 B2 | 8/2004 | Kenison et al. | |
| 6,782,948 B2 | 8/2004 | Echols et al. | |
| 6,789,619 B2 | 9/2004 | Carlson et al. | |
| 6,802,373 B2 | 10/2004 | Dillenbeck et al. | |
| 6,915,848 B2 * | 7/2005 | Thomeer et al. | 166/250.11 |
| 6,935,425 B2 | 8/2005 | Aronstam | |
| 6,973,416 B2 | 12/2005 | Denny et al. | |
| 6,976,535 B2 | 12/2005 | Aronstam et al. | |
| 6,989,764 B2 | 1/2006 | Thomeer et al. | |
| 7,014,100 B2 | 3/2006 | Zierolf | |
| 7,025,146 B2 | 4/2006 | King et al. | |
| 7,044,229 B2 | 5/2006 | Tennoy et al. | |
| 7,062,413 B2 | 6/2006 | Denny et al. | |
| 7,063,148 B2 | 6/2006 | Jabusch | |
| 7,066,256 B2 | 6/2006 | Dillenbeck et al. | |
| 7,084,769 B2 | 8/2006 | Bauer et al. | |
| 7,128,154 B2 | 10/2006 | Giroux et al. | |
| 7,159,654 B2 | 1/2007 | Ellison et al. | |
| RE39,583 E | 4/2007 | Upchurch | |
| 7,201,231 B2 | 4/2007 | Chaplin et al. | |
| 7,252,152 B2 | 8/2007 | LoGiudice et al. | |
| 7,273,102 B2 | 9/2007 | Sheffield | |
| 7,275,602 B2 | 10/2007 | Green et al. | |
| 7,283,061 B1 | 10/2007 | Snider et al. | |
| 7,295,491 B2 | 11/2007 | Carstensen | |
| 7,296,462 B2 | 11/2007 | Gregory et al. | |
| 7,322,410 B2 | 1/2008 | Vinegar et al. | |
| 7,337,850 B2 | 3/2008 | Contant | |
| 7,385,523 B2 | 6/2008 | Thomeer et al. | |
| 7,389,205 B2 | 6/2008 | Denny et al. | |
| 7,400,263 B2 | 7/2008 | Snider et al. | |
| 7,455,108 B2 | 11/2008 | Jenkins et al. | |
| 7,484,625 B2 | 2/2009 | Scott et al. | |
| 7,500,389 B2 | 3/2009 | Green et al. | |
| 7,503,398 B2 | 3/2009 | LoGiudice et al. | |
| 7,510,001 B2 | 3/2009 | Spring et al. | |
| 7,543,637 B2 | 6/2009 | Green et al. | |
| 7,562,712 B2 | 7/2009 | Cho et al. | |
| 7,588,100 B2 | 9/2009 | Hamilton | |
| 7,591,318 B2 | 9/2009 | Tilghman | |
| 7,606,682 B2 | 10/2009 | Denny et al. | |
| 7,634,942 B2 | 12/2009 | Green et al. | |
| 7,665,527 B2 | 2/2010 | Loretz | |
| 7,714,741 B2 | 5/2010 | Snider et al. | |
| 7,912,678 B2 | 3/2011 | Denny et al. | |
| 7,946,356 B2 | 5/2011 | Koederitz et al. | |
| 7,958,715 B2 | 6/2011 | Kinert et al. | |
| 7,963,452 B2 | 6/2011 | Moritz | |
| 8,016,037 B2 | 9/2011 | Bloom et al. | |
| 2002/0020533 A1 * | 2/2002 | Tubel | 166/313 |
| 2002/0195247 A1 * | 12/2002 | Ciglenec et al. | 166/250.11 |
| 2003/0029611 A1 | 2/2003 | Owens | |
| 2003/0174099 A1 | 9/2003 | Bauer et al. | |
| 2004/0239521 A1 | 12/2004 | Zierolf | |
| 2005/0230109 A1 | 10/2005 | Kammann et al. | |
| 2006/0087448 A1 | 4/2006 | Boer et al. | |
| 2006/0124310 A1 | 6/2006 | de Cardenas et al. | |
| 2006/0175404 A1 | 8/2006 | Zierolf | |
| 2007/0030167 A1 * | 2/2007 | Li et al. | 340/855.1 |
| 2007/0124220 A1 | 5/2007 | Griggs et al. | |
| 2007/0267221 A1 | 11/2007 | Giroux et al. | |
| 2007/0272411 A1 | 11/2007 | de Cardenas et al. | |
| 2007/0285275 A1 | 12/2007 | Purkis et al. | |
| 2008/0000690 A1 | 1/2008 | Lynde | |
| 2008/0041597 A1 | 2/2008 | Fisher et al. | |
| 2008/0105427 A1 | 5/2008 | Hampton et al. | |
| 2008/0128126 A1 | 6/2008 | Dagenais et al. | |
| 2008/0128168 A1 | 6/2008 | Purkis et al. | |
| 2008/0149345 A1 | 6/2008 | Marya et al. | |
| 2008/0245534 A1 | 10/2008 | Purkis | |
| 2008/0271887 A1 | 11/2008 | Snider et al. | |
| 2009/0044937 A1 | 2/2009 | Purkis | |
| 2009/0065214 A1 | 3/2009 | Purkis | |
| 2009/0090502 A1 | 4/2009 | Lumbye et al. | |
| 2009/0114401 A1 | 5/2009 | Purkis | |
| 2009/0115624 A1 * | 5/2009 | Tinnen et al. | 340/853.6 |
| 2009/0121895 A1 | 5/2009 | Denny et al. | |
| 2009/0151939 A1 | 6/2009 | Bailey et al. | |
| 2009/0208295 A1 | 8/2009 | Kinert et al. | |
| 2009/0223663 A1 | 9/2009 | Snider et al. | |
| 2009/0223670 A1 | 9/2009 | Snider | |
| 2009/0230340 A1 | 9/2009 | Purkis | |
| 2009/0266544 A1 | 10/2009 | Redlinger et al. | |
| 2009/0272544 A1 | 11/2009 | Giroux et al. | |
| 2009/0283454 A1 | 11/2009 | Scott et al. | |
| 2010/0044034 A1 | 2/2010 | Bailey et al. | |
| 2010/0089583 A1 | 4/2010 | Xu et al. | |
| 2010/0170681 A1 | 7/2010 | Purkis | |
| 2010/0200243 A1 | 8/2010 | Purkis | |
| 2010/0200244 A1 | 8/2010 | Purkis | |
| 2011/0148603 A1 | 6/2011 | Denny et al. | |
| 2011/0204143 A1 | 8/2011 | Mackenzie et al. | |
| 2011/0248566 A1 | 10/2011 | Purkis | |
| 2012/0065126 A1 | 3/2012 | Bruser et al. | |

FOREIGN PATENT DOCUMENTS

| | | |
|---|---|---|
| GB | 2352261 A | 1/2001 |
| WO | 9205533 A1 | 4/1992 |

(56) References Cited

FOREIGN PATENT DOCUMENTS

| WO | 00/73625 | A1 | 12/2000 |
| WO | WO-01/65718 | A2 | 9/2001 |
| WO | 2006046075 | A2 | 5/2006 |
| WO | 2006051250 | A1 | 5/2006 |
| WO | 2006082407 | A1 | 8/2006 |
| WO | 2006082421 | A1 | 8/2006 |
| WO | 2006109008 | A1 | 10/2006 |
| WO | 2006120466 | A2 | 11/2006 |
| WO | WO 2007108700 | A1 * | 9/2007 |
| WO | 2007125335 | A1 | 11/2007 |
| WO | 2008059260 | A2 | 5/2008 |
| WO | 2009/050518 | A2 | 4/2009 |
| WO | 2009050517 | A2 | 4/2009 |
| WO | 2009098512 | A2 | 8/2009 |
| WO | 2009109788 | A1 | 9/2009 |
| WO | 2009114356 | A1 | 9/2009 |
| WO | 2010038072 | A1 | 4/2010 |
| WO | 2010086654 | A1 | 8/2010 |
| WO | 2010149643 | A1 | 12/2010 |
| WO | 2010149644 | A1 | 12/2010 |
| WO | WO-2012065123 | A2 | 5/2012 |
| WO | WO-2012065126 | A2 | 5/2012 |

OTHER PUBLICATIONS

Fraley, Karen, et al., "RFID Technology for Downhole Well Applications," Exploration & Production—Oil & Gas Review 2007—OTC Edition, 3 pages.

Snider, Philip M., et al., "AADE 2009NTCE-16-04: RFID Downhole Tools and Development for the Drilling Environment," AADE 2009 National Technical Conference & Exhibition, New Orleans, Louisiana, 2009NTCE-16-04 Tech Paper, pp. 1-3.

Runge, Paul, "Petrowell Operations Report," Petrowell RFID Circulation Sub First Deployment for CNR International, Aug. 25, 2005, 11 pages.

*Hubertus* v. *Thomeer, et al.* v. *Snider, et al.*, Patent Interference No. 105,466 (SCM) (Technology Center 2600), Before the Board of Patent Appeals and Interferences, Entered Nov. 21, 2006, 3 pages.

M-1 Swaco, Company News, JPT, May 2008, 1 page.

* cited by examiner

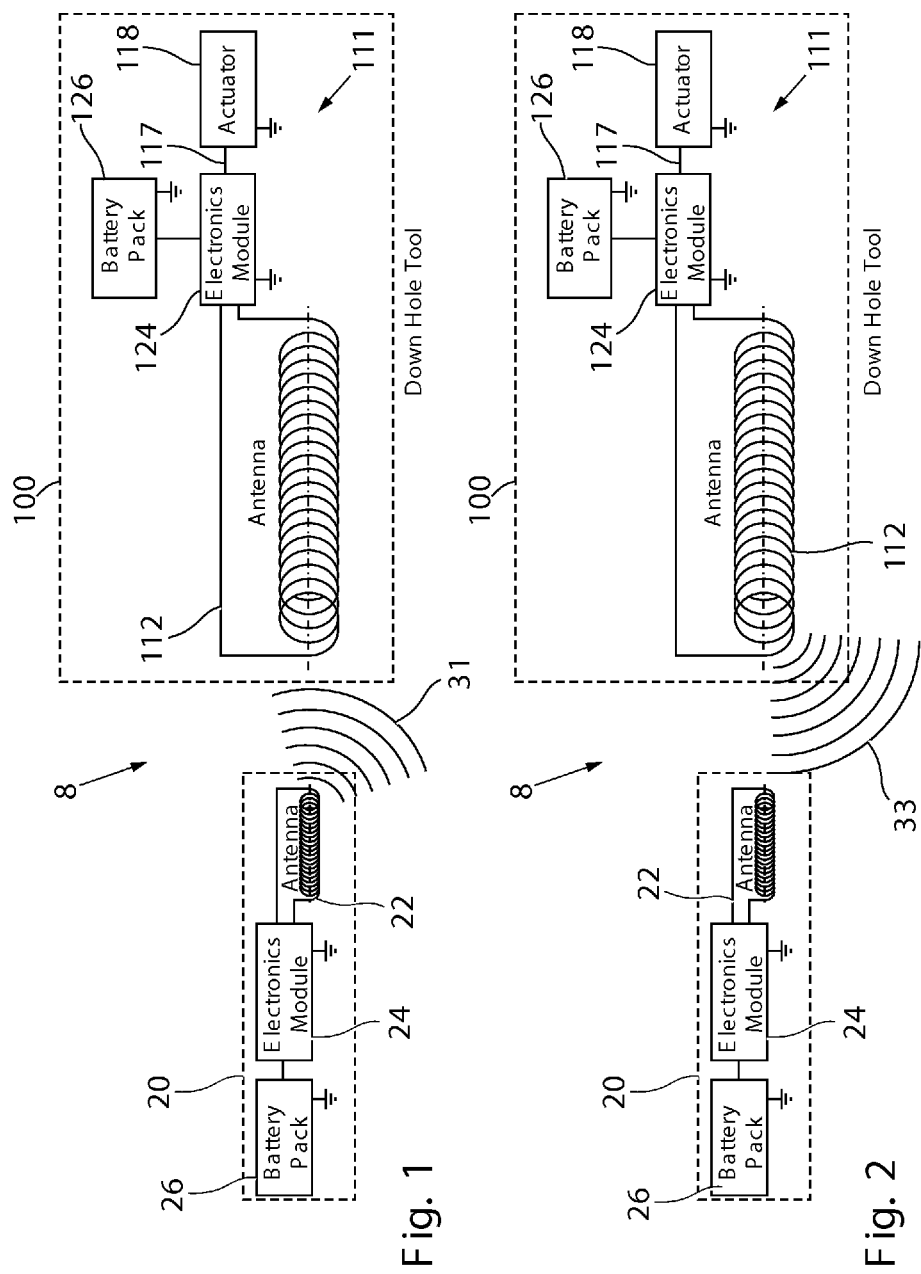

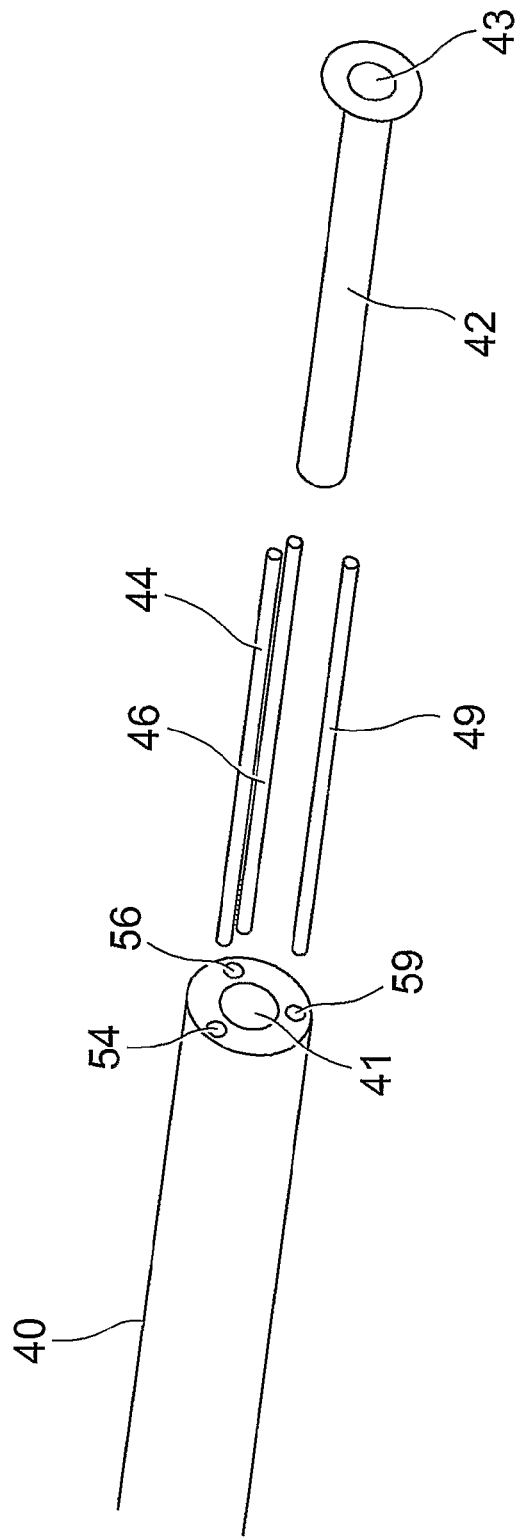

SWITCHING DEVICE FOR, AND A METHOD OF SWITCHING, A DOWNHOLE TOOL

The present invention relates to a switching device for a downhole tool.

Many downhole tools rely on batteries as a source of power. If a tool is assembled with the batteries permanently connected to an electronic circuit within the tool, battery life can be severely reduced by the time that the tool is run downhole. This is clearly undesirable since the batteries can flatten downhole leaving the tool without a power source.

In order to conserve battery life some tools are assembled without the battery connected to an electronic circuit, and a switch is provided to selectively connect the battery on demand. Conventional switches are accessible from the exterior of the tool allowing an operator to switch the tool "on" and enable connection of the battery before the tool is run downhole. An example of one such switch is a mechanical on/off switch accessible to an operator on the exterior of the tool. The switch is hard-wired to a battery provided in a sealed chamber within the tool. However, the wire leading to the switch on the external surface of the tool represents a leak path and potential failure point. Another known switch avoids the above problem by providing a mechanical switch comprising two spaced electrical contacts in the tool that can be closed by an applied magnetic field. For example, a reed switch can be embedded in a sidewall of a tool and a cutaway portion can be provided in the exterior of the tool allowing a magnet to be inserted therein to operate the reed switch. This is advantageous as there is no leak path to the exterior of the tool. However, the reed switch itself is a mechanical device and is especially prone to vibration or corrosion, which can be a source of failure.

According to a first aspect of the invention, there is provided a switching device for a downhole tool, the switching device comprising an electronic switch for accommodation within a downhole tool and an activator for remote switching of the electronic switch.

Preferably, the activator is adapted for wireless activation of the electronic switch. Preferably, the activator is constructed to enable contactless activation of the electronic switch.

The electronic switch can be switched between an active and an inactive configuration. The electronic switch can be switched between the active and the inactive configurations by the activator.

Provision of the switching device according to the invention conserves battery life of a tool and enables a tool to be switched "on" at surface just prior to being run downhole. An advantage of the invention is that it provides a non-mechanical method of switching a tool "on" or into the active configuration.

The electronic switch can comprise a closed electrical system with no external electrical connections. Preferably the electronic switch comprises electrical components and no mechanical components.

The electronic switch can comprise an electronics module and a power source.

In the active configuration, the switch can allow electrical connection between the electronics module and the power source. In the inactive configuration, the switch can prevent electrical connection between the electronics module and the power source.

The electronics module and the power source can be housed within the tool. The electronics module and the power source can be housed within a sidewall of the tool. The electronics module can comprise electrical components arranged on a circuit board and the power source can be a battery.

The electronic switch can comprise an electronic latch, such that once the electronic switch is switched into the active configuration, the electronic latch retains the electronic switch in the active configuration. The electronic latch can form part of the electronics module.

Since the electronic switch can be remotely switched using the activator, there is no requirement for placement of a mechanical switch on the exterior of the tool.

The activator can energise part of the electronic switch in order that the activator can communicate with the electronic switch. The electronic switch can comprise a receiver and the activator can energise the receiver.

The receiver can be constructed and arranged to receive a signal from the activator. The receiver can be electrically connected to the electronics module.

The activator can comprise a transmitter to transmit electromagnetic energy for remotely communicating with the electronic switch.

The receiver and the activator can be remotely communicable with one another. The receiver and the activator can be remotely communicable using radio frequency identification.

The receiver and activator can be remotely communicable using a frequency in the range 20 Hz-600 kHz. The frequency selected for remote communication can be in the range 50 Hz-50 kHz.

The communication frequency of the activator and the receiver of the electronic switch can be selected depending on the predetermined location of the electronic switch within the tool. For example, a lower frequency is preferably selected where the receiver of the electronic switch is surrounded by metal. Alternatively, the receiver can be arranged to form part of the throughbore of the tool and a higher frequency can be selected for communication with the activator.

The receiver and activator can be remotely communicable using a resonant frequency of the receiver. Communication at the resonant frequency is advantageous since this allows optimum energy transfer between the receiver and the activator. Furthermore, it increases the likelihood that the electronic switch will pick up a signal from the activator in a metal environment. Additionally, by requiring the electronic switch to respond to a resonant frequency supplied by the activator, the likelihood of inadvertent actuation of the electronic switch by stray frequencies is reduced.

The receiver can also act as a transmitter. The electronic switch can thereby transmit information to the activator. The electronic switch can communicate information regarding whether the electronic switch is in the active configuration or the inactive configuration. The electronic switch can communicate information such as a unique address allowing identification and status of the tool.

The electronics module can include a rectifier to convert electromagnetic energy received from the activator via the receiver into direct current, which can then be used to switch the electronic switch into the active configuration.

The receiver can be an antenna. The antenna can be a coiled conductor. The coiled conductor can circumscribe the throughbore of the tool. The coiled conductor can be coaxial with the throughbore of the tool.

Alternatively, the antenna can be provided in parallel to the throughbore of the tool. The antenna can be housed within a sidewall of the tool.

The activator can also be configured to reprogram the electronic switch. The activator can be a hand held device. The activator can comprise a visual display.

The activator can be constructed for remote communication with the electronic switch at surface.

The activator can be configured to test the tool prior to being run downhole.

The activator can comprise a reader to receive information. The reader can be useful for reading the details/address of the electronics module of the electronic switch.

The activator can also be configured to reprogram the electronics module of the electronic switch.

The electronic switch can comprise a timer and the activator can command the switch into an active configuration, to be carried out after a predetermined time delay. The timer can form part of the electronics module.

According to a second aspect of the invention, there is provided a tool for use downhole, the tool accommodating the switching device of the first aspect of the invention.

The tool can be a downhole tool. The tool can have a throughbore and the activator can be sized to travel within the throughbore of the tool, wherein the activator and the tool are arranged such that the activator is inserted into the throughbore of the tool to activate the tool.

The receiver of the electronic switch can have a dual function and can also act as a receiver for remote communication and/or actuation of the tool downhole.

The electronic switch can be accommodated within a sidewall of the tool.

According to a third aspect of the invention, there is provided a contactless and wireless method of activating a battery powered circuit comprising:

electrically connecting the electronic switch to the battery powered circuit; and remotely switching the electronic switch using an activator and thereby activating the battery powered circuit.

According to the third aspect of the invention, there is provided an apparatus for contactless and wireless activation of a battery powered circuit comprising:

an electronic switch electrically connected to the battery powered circuit; and an activator for remote switching of the electronic switch to activate the battery powered circuit.

Preferably the apparatus and method according to the third aspect of the invention are for powering a circuit in a downhole tool.

All features and steps of the first and second aspects of the invention can be combined with the third aspect of the invention where appropriate.

Embodiments of the invention will now be described with reference to the accompanying drawings in which:—

FIG. 1 is a schematic view of a switching device in accordance with the invention showing an activator communicating with an electronic switch within a tool;

FIG. 2 is a schematic view of the switching device of FIG. 1 showing the electronic switch communicating with the activator; and FIG. 3 is an exploded view of an alternative embodiment of a downhole tool incorporating an electronic switch.

A switching device is shown generally at 8 in FIGS. 1 and 2. The switching device 8 comprises an activator 20, which is preferably in the form of a handheld activator unit 20, and an electronic switch 111 located within a downhole tool 100. The downhole tool 100 typically comprises OCTG pin and box screwthread connections to provide connection to other components to allow the downhole tool 100 to be incorporated in a downhole string and preferably comprises a cylindrical mandrel (not shown) having a throughbore typically of an inner diameter no smaller that the throughbore of the rest of the downhole string, and an outer surface with a sidewall therebetween.

The activator 20 includes a battery pack 26 electrically connected to an electronics module 24 that is in turn electrically connected to an antenna 22. The activator 20 is a handheld unit with a display panel (not shown).

The battery pack 26 within the activator 20 is preferably selected to provide as much power as possible since the activator 20 is used at, or controlled from, the surface of a downhole wellbore such as on a drilling rig or platform or the like. Therefore, the battery pack 26 within the activator 20 can be removed and replaced as frequently as required. This is advantageous since the more powerful the battery pack 26, the stronger the signal emitted by the antenna 22 and the greater the likelihood that the signal from the antenna 22 within the activator 20 will be picked up by the electronic switch 111 within the downhole tool 100.

Optionally, the activator 20 can be provided with an on/off switch such as a mechanical switch (not shown) located on an external surface of the activator 20 to conserve life of the battery pack 26 within the activator 20 when the activator 20 is not in use. This is especially useful when the activator 20 is intended for use at or near the surface of the downhole wellbore and therefore unlike the downhole tool 100 does not have to withstand high downhole temperatures and pressures and exposure to aggressive fluids.

The electronic switch 111 comprises the following components: a receiver/transmitter in the form of an antenna 112; an electronics module 124; an actuator 118; and a power source in the form of a battery pack 126. These components form a closed electrical circuit and require no external electrical connectors. The electronics module 124, actuator 118 and battery pack 126 are housed within a sidewall of the tool 100.

The downhole tool 100 of FIGS. 1 and 2 has a throughbore (not shown). The antenna 112 is arranged to receive and transmit a radio frequency identification (hereinafter RFID) signal and is located in a sidewall of the tool 100 parallel to the throughbore. The antenna 112 is electrically connected to the actuator 118 via the electronics module 124. Initially, the electronic switch 111 is "off" or arranged in an inactive configuration, in which there is no electrical connection between the electronics module 124 and the battery pack 126.

The electronics module 124 includes a rectifier to convert the electromagnetic energy received from the antenna 112 as an alternating current into a direct current, which is in turn used to activate an electronic latch such as a suitable transistor or the like (not shown) located on or within the electronic module 24 into the active configuration. The electronics module 124 is electrically connected to the battery pack 126 in the active configuration. Thus, on receiving the necessary command via the antenna 112, the electronic latch instructs the electronics module 124 and the battery pack 126 to turn "on" and move into the active configuration in which there is electrical connection between the electronics module 124 and the battery pack 126. The electronics module 124 can then provide power via wire 117 to actuator 118 either straightaway or after a period of time has elapsed or can alternatively power the antenna 112 to await further instruction from eg. an RFID tag (not shown) which is particularly possible with the RFID Downtool™ system that could be used with the embodiment shown in FIG. 3 as will be described subsequently. The actuator 118 is any sort of electrically operated device that an operator wishes to be able to operate such as a motor or sliding sleeve etc. It will be understood by those skilled in the art that the wire 117 can be relatively short if actuator 118 is located within downhole tool 100 or could be relatively long if the actuator 118 is provided in an adjacent downhole component in the string. In other words, the actuator 118 need not be included in the same downhole tool 100 as the antenna 112 and/or electronics module 124 if suitable wire connections 117 are provided.

The electronics module 124 also includes transistors and other semi-conductors arranged on a circuit board so as to create an electronic latch and ensure that the electronic switch 111 remains in the active configuration once the electronics module 124 is connected to the battery pack 126.

The advantage of using electronic components suitably interconnected on a circuit board within the electronics module 124 in order to switch between the inactive and the active configuration (and subsequently to retain the electronic switch 111 in the active configuration) is that semi-conductors and other electronic components are very reliable in a high vibration environment, thereby alleviating many of the problems associated with conventional mechanical switches.

The antenna 22 of the activator 20 and the antenna 112 of the electronic switch 111 communicate at a specific radio frequency (RF) signal. According to the present embodiment, the communication frequency is selected as the resonant frequency of the antenna 112, having a value of around 125 kilohertz. Communication using RF signals at the resonant frequency allows optimum energy transfer between the activator 20 and the antenna 112 of the downhole tool 100. Another advantage of making use of the resonant frequency is that it enhances the likelihood of the antenna 112 picking up a signal in the metal environment of the downhole tool 100 and thus makes the most of the very low energy that will be output by the antenna 112 to activate the electronic latch.

Typically, the downhole tool 100 is assembled onshore and the antenna 112, electronics module 124, actuator 118 and battery 126 making up the switching device 111 are sealed within the sidewall of the tool 100. Initially, the electronic switch 111 is in the inactive configuration and the battery pack 126 is not in electrical connection with the electronics module 124. The downhole tool 100 can then be transported offshore in the inactive configuration until it is ready for use downhole. Therefore the power of the battery pack 126 is conserved.

When an operator wants to run the tool downhole, the operator will need to switch the electronic switch 111 into the active configuration. If the activator 20 has a switch, it is switched on so that the antenna 22 emits electromagnetic energy in the form of an RF signal at the chosen frequency as shown schematically at 31 in FIG. 1. The activator 20 is placed in the throughbore of the downhole tool 10 by the operator and travels along the length of the downhole tool 100 in the throughbore. During passage of the activator 20 through the tool 100, the antenna 22 energises the antenna 112 of the downhole tool 100 by emitting the resonant RF signal. The rectifier in the electronics module 124 uses the resultant direct current to activate the electronic latch/transistor in the switch 111 into the active configuration. In other words the latch/transistor in the electronic module 124 is switched on by the voltage provided by the antenna 112 and once it is switched on, the battery 126 and said transistor latches the electronic module 124 in the on configuration. In the active configuration, the battery pack 126 is electrically connected to the electronics module 124 and therefore powers the same. The electronics module 124 is latched in the active configuration by the electronic latch in the form of semi-conductors in the electronics module 124.

Once the battery pack 126 is electrically connected with the electronics module 124, it can supply power to the electronics module 124 for powering further operations of the downhole tool 100.

The antenna 22 of the activator 20 can also be configured for use as a receiver. Immediately following the energising of the antenna 112 of the downhole tool 100 and switching of the electronic switch 111 into the active configuration, the antenna 22 can receive signals (shown schematically as 33 in FIG. 2) transmitted from the antenna 112 of the downhole tool 100. The activator 20 can read information transmitted from the electronics module 124, such as the specific electronic address allotted to each tool 100. This enables easy identification of the specific downhole tool 100 on the display panel of the activator 20. The activator 20 can then change the tool address if necessary.

The activator 20 can also collect information regarding the programming of the electronics module 124 before the tool 100 is run downhole. The activator 20 can be used to reprogramme the electronics module 124 in response to changing requirements or conditions offshore just prior to running the tool 100 downhole. Additionally, the activator 20 can test the tool 100 before the tool 100 is run downhole. This is especially useful for the testing of reversible operations of the downhole tool 100 to ensure that the tool 100 is functioning correctly.

According to the embodiment described above, the antenna 112 of the downhole tool 100 is parallel with the throughbore. However, in the alternative embodiment shown in FIG. 3, the antenna forms part of the inner diameter of the tool 40 and surrounds the throughbore. This is advantageous as the antenna can be readily used for another application, such as remote communication using RFID Downhole™ (Trade Mark) following the remote switching of the tool at surface.

An exterior of a substantially cylindrical hollow tool 40 is shown at FIG. 3. The tool 40 has a throughbore 41 and circumferentially spaced bores 54, 56, 59 drilled in a sidewall of the tool parallel to the throughbore 41. The cylindrical bore 54 receives an electronics module 44 in the form of a cylindrical tube. The cylindrical bore 56 receives a battery pack tube 46 and the cylindrical bore 59 receives an actuator in the form of a motor 49. The motor 49 is provided to allow the tool 40 to perform a downhole operation. All of the cylindrical bores 54, 56, 59 are electrically connected to one another to electrically connect the battery pack tube 46, the electronics module 46 and the motor 49.

An antenna 42 is inserted within the throughbore 41 of the tool 40. The radio frequency identification (hereinafter RFID) antenna 42 has a throughbore 43. The RFID antenna 42 is cylindrical and comprises an inner liner and a coiled conductor in the form of a length of copper wire that is concentrically wound around the inner liner in a helical co-axial manner. Insulating material circumscribes an exterior of the coiled conductor. The liner and the insulating material are formed from a non-magnetic and non-conductive material such as fibreglass, rubber or the like. The RFID antenna 42 is formed such that the insulating material and the coiled conductor are sealed from the outer environment and the throughbore. The antenna 42 forms part of an inner diameter of the tool 40.

According to the present embodiment a high communication frequency (for example 100 kilohertz) is selected for communication between the antenna 42 of the tool 40 and the activator 20. Selection of higher frequencies is possible since the antenna 42 is not separated from the throughbore 43 by metal. This is in contrast to the previous embodiment where the antenna 112 is housed within a side wall of the tool 100.

Lower frequencies (for example, those above around 20 hertz) are more suitable if there is significant amount of metal in the side wall of the tool between the antenna 12 and the throughbore.

In order to switch the tool 40 of FIG. 3 into the active configuration, the activator 20 is run along the throughbore 43 of the tool 40. The antenna 22 of the activator 20 energises the antenna 42 to send a signal to the electronics module tube 44 and activate the switch in the same manner as previously described for the first embodiment.

The RFID antenna 42 surrounding the throughbore is a preferred arrangement for receiving a signal from the activator 20 because the antenna 42 entirely surrounds the activator 20 when located in the throughbore 43 and there is no metal located therebetween.

The present invention is more reliable than a mechanical switch.

Modifications and improvements can be made without departing from the present invention. For example, the activator 20 can be attached on a wireline and run to a downhole location in order to activate the electronic switch 111. Certain modifications would be required to the activator 20 in order to ensure it is suitable for use downhole.

The invention claimed is:

1. A switching system for a downhole tool, the switching system comprising:
    an electronic switch for accommodation within a downhole tool, the electronic switch comprising a switchable electrical connection between an electronics module and a power source, a wireless signal receiver device configured to receive a wireless signal and a closed electrical system with no external electrical connections; and
    an activator for remote switching of the electronic switch, the activator being a handheld surface activator having a wireless and contactless activation mechanism to activate the electronic switch at a surface of a well without physical connection between the electronic switch and the activator;
    wherein in an active configuration the electronics module and the power source are electrically connected by the switchable electrical connection and in an inactive configuration the electronics module and the power source are not electrically connected by the switchable electrical connection.

2. The switching system for a downhole tool according to claim 1, wherein the electronic switch comprises electrical components and no mechanical components.

3. The switching system for a downhole tool according to claim 1, wherein the electronics module and the power source are housed within a sidewall of the downhole tool and the power source comprises a battery.

4. The switching system for a downhole tool according to claim 1, wherein the wireless signal receiver is constructed and arranged to receive a signal from the activator, wherein the wireless signal receiver is electrically connected to the electronics module.

5. The switching system for a downhole tool according to claim 1, wherein the activator comprises a transmitter to transmit electromagnetic energy for remotely communicating with the electronic switch.

6. The switching system for a downhole tool according to claim 1, wherein the wireless signal receiver and the activator are remotely communicable with one another.

7. The switching system for a downhole tool according to claim 6, comprising a signal conduit connecting the wireless signal receiver to the activator in the active configuration, wherein the wireless signal receiver transmits information through the signal conduit to the activator in the active configuration.

8. The switching system for a downhole tool according to claim 7, wherein the electronic switch in the downhole tool stores a unique address allowing identification and status of the downhole tool.

9. The switching system for a downhole tool according to claim 1, wherein the wireless signal receiver comprises an antenna.

10. The switching system for a downhole tool according to claim 1, including an electrical conduit between the wireless signal receiver device and the electronics module.

11. A downhole tool for use in a well, comprising:
    a cylindrical sidewall surrounding a tool throughbore;
    a closed electrical circuit disposed with the cylindrical sidewall, the closed electrical circuit comprising an electronics module, a battery, a tool antenna, and an actuator, wherein the battery is not connected to the electronics module when the downhole tool is in an inactive configuration and the battery is connected to the electronics module when the downhole tool is in an active configuration, and wherein the closed electronic circuit is responsive to an activate signal received at the tool antenna to switch the downhole tool to the active configuration; and
    a handheld surface activator to communicate the activate signal to the tool antenna when the handheld surface activator is disposed in the tool throughbore and without physical connection between the activator and the closed electrical circuit.

12. The downhole tool of claim 11, wherein the tool antenna is disposed in the cylindrical sidewall.

13. The downhole tool of claim 11, wherein the tool antenna surrounds the tool throughbore.

14. The downhole tool of claim 11, wherein the tool antenna is not separated from the tool throughbore by metal.

15. The downhole tool of claim 11, wherein the tool antenna is disposed in the tool throughbore, the tool antenna is cylindrical and forms an antenna throughbore to receive the handheld surface activator when the activate signal is communicated to the tool antenna.

16. A method of activating a downhole tool for use in an oil or gas well, the tool having a throughbore, a sidewall surrounding the throughbore, and a closed electrical circuit disposed with the sidewall, the closed electrical circuit comprising an electronics module, a battery, a tool antenna, and an actuator, wherein the method includes: inserting a handheld activator into the throughbore of the tool and sending an activate signal from the handheld activator to the tool antenna without physical connection between the handheld activator and the closed electrical circuit of the tool prior to running the downhole tool into the well, wherein the activate signal received at the tool antenna switches the tool from an inactive configuration to an active configuration electrically connecting the battery and the electronics module.

17. The method of claim 16, wherein the handheld activator is inserted into the throughbore of the tool at a location adjacent to the tool antenna disposed in the cylindrical sidewall.

18. The method of claim 16, wherein the tool antenna is cylindrical and forms an antenna throughbore and wherein the handheld activator is inserted into the antenna throughbore before the activate signal is communicated to the tool antenna.

* * * * *